Figure 1:
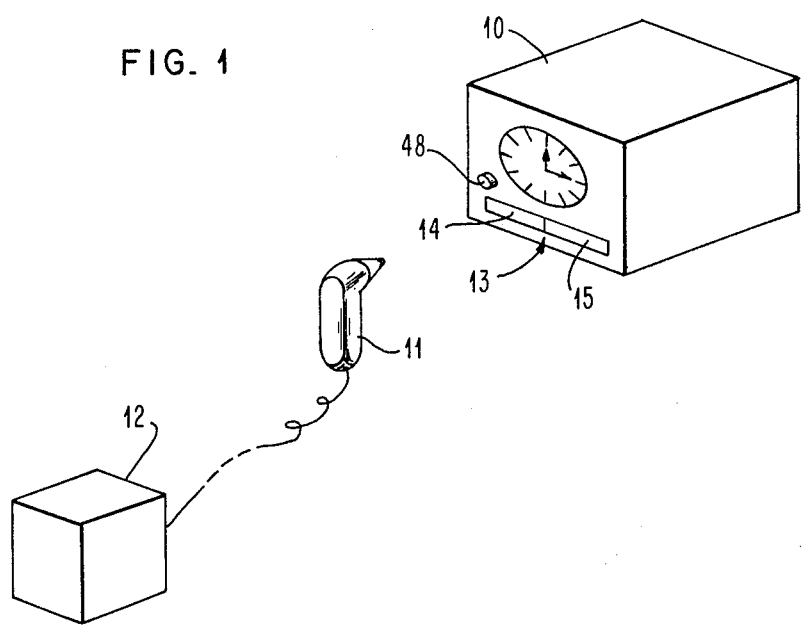

United States Patent [19]

Rohen

[11] 4,354,100
[45] Oct. 12, 1982

[54] SCANNABLE READOUT DEVICE

[75] Inventor: James E. Rohen, Mint Hill, N.C.

[73] Assignee: International Business Machines Corporation, Armonk, N.Y.

[21] Appl. No.: 194,207

[22] Filed: Oct. 6, 1980

[51] Int. Cl.³ .................... G06K 7/08; G06K 19/06
[52] U.S. Cl. ............................ 235/449; 340/365 L
[58] Field of Search ............... 235/450, 493, 492, 494, 235/449; 364/719, 851, 852, 860; 360/40, 2, 61, 123; 340/350, 352, 365 R, 365 L, 147 G; 178/18, 19

[56] References Cited

U.S. PATENT DOCUMENTS

| | | | |
|---|---|---|---|
| 3,103,665 | 9/1963 | Martin et al. | 346/74 |
| 3,419,883 | 12/1968 | Chapsky | 346/74 |
| 3,639,731 | 2/1972 | McNeill | 235/61 |
| 4,019,206 | 4/1977 | Haas | 360/123 |
| 4,225,780 | 9/1980 | Jacoub et al. | 235/493 |

OTHER PUBLICATIONS

S. J. Frese, *Inductive Tape Synthesizer for R-W Head Testing,* published Jan. 1969, IBM Technical Disclosure Bulletin, vol. 11, No. 8, pp. 1043, 1044.

*Primary Examiner*—Thomas A. Robinson
*Attorney, Agent, or Firm*—E. Ronald Coffman

[57] ABSTRACT

An array of individually controllable conductors presents variable data as a magnetic flux pattern that can be scanned by equipment presently used to scan prerecorded magnetic strips.

6 Claims, 5 Drawing Figures

SCANNABLE READOUT DEVICE

Many data entry tasks, traditionally performed on a keyboard, have been made more convenient and reliable by the use of magnetically encoded strips that are scannable by an operator. This convenient data entry technique is, however, limited to pre-recorded information which still requires the use of a keyboard to enter variable information.

Applications requiring variable information input include the reading of utility meters such as those that monitor the use of gas, electricity, water and oil, weighing scales such as those used to weigh meat or produce at a grocery store, gasoline pumps, time clocks and time logs such as those maintained for aircraft maintenance. In each of these applications, variable data is generated which conventionally is presented by a display to an operator who copies the information from the display onto a record form, either by hand or by manipulation of a keyboard. While teleprocessing techniques are known by which such information could be directly communicated from the source to a computer, such an arrangement requires a complex assembly of substantially permanently interconnected equipment, the expense of which may not be otherwise justified. In addition, it is often required that such variable information be properly associated with additional fixed information in order to properly capture a transaction or event. For example, if certain components of an aircraft are to be inspected periodically, based on in-flight hours of operation, it may be desirable to readily combine the variable information concerning in-flight hours with fixed information such as the component or even component serial number, as well as an ID number for the inspector.

It has thus been an object of my invention to provide a scannable strip having an automatically settable flux pattern by which variable data is made available for scanning in the same format as data is presented for scanning on a magnetic record.

Another object of my invention has been to provide a data entry system including a scannable strip presenting variable data, as well as a scannable strip presenting fixed data. My invention achieves these objectives through the provision of an array of parallel conductors extending transversely on or within a stripe-like scanning track. The direction of electrical current applied to each of the conductors determines the polarity of a flux field surrounding that conductor. The spacing of the conductors is selected such that the composite pattern of flux produced by the simultaneous energization of conductors, emulates the pattern of flux produced by a recorded strip of magnetic tape, both in character and in format. The array of conductors thus can present a settable flux pattern through control of the current flow and this settable flux pattern can be scanned by equipment that presently exists to scan pre-recorded magnetic strips. Transactions requiring a combination of fixed and variable data are thus readily accomplished by a single piece of scanning equipment that is passed over conventional pre-recorded magnetic strips and also is passed over the variable data strip of my invention.

While a simple array of parallel conductors can be expected to produce a flux pattern of adequate strength and precision to be scanned reliably by typical scanning equipment for pre-recorded magnetic strip, various arrangements can be employed to enhance the operation over such a simple arrangement. Such enhancements involve the use of multiple layers of conductors to increase field strength for a given conductor current carrying capacity, as well as the use of flux directors to assist in shaping the ultimate flux output field.

Figure 2:
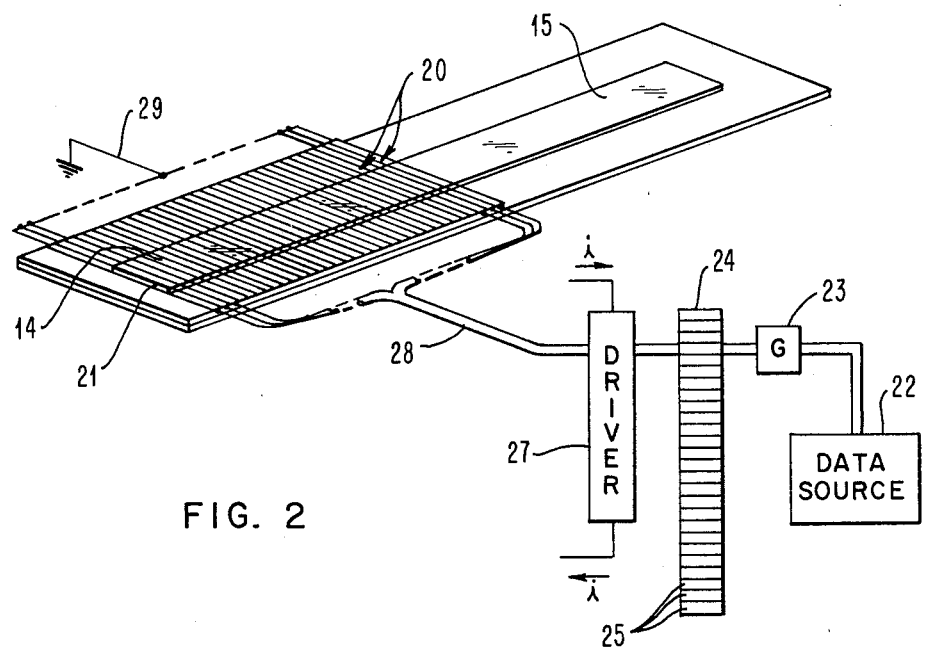
Figure 3:
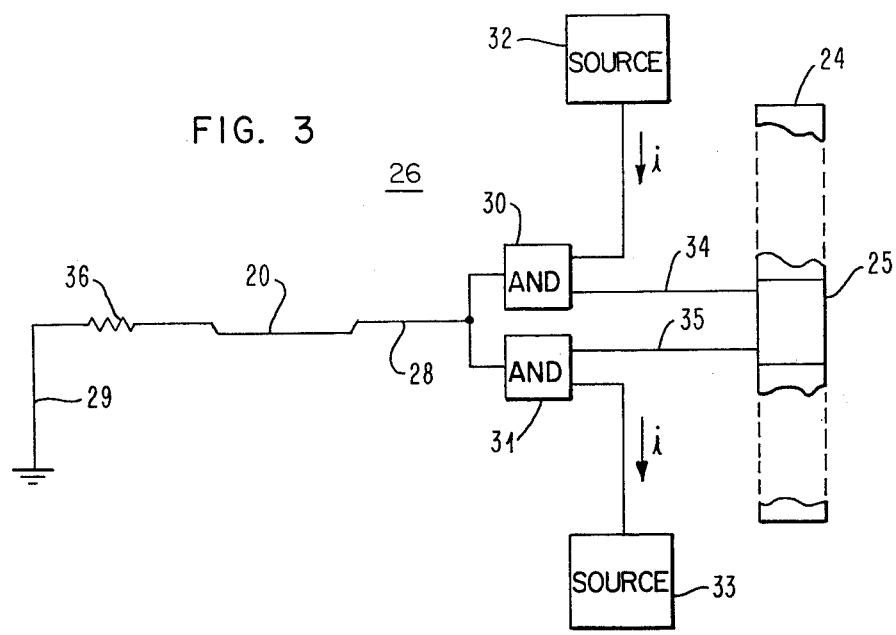
Figure 5:
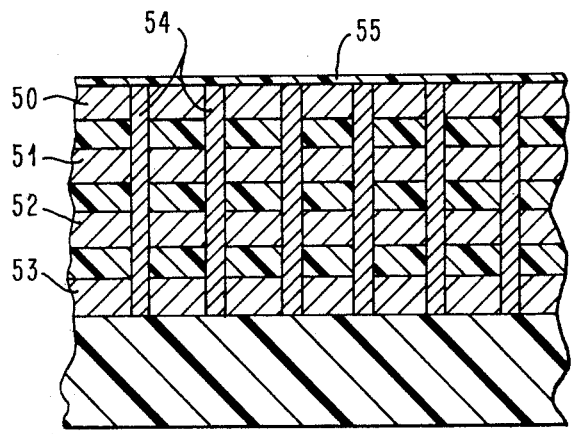
Figure 4:
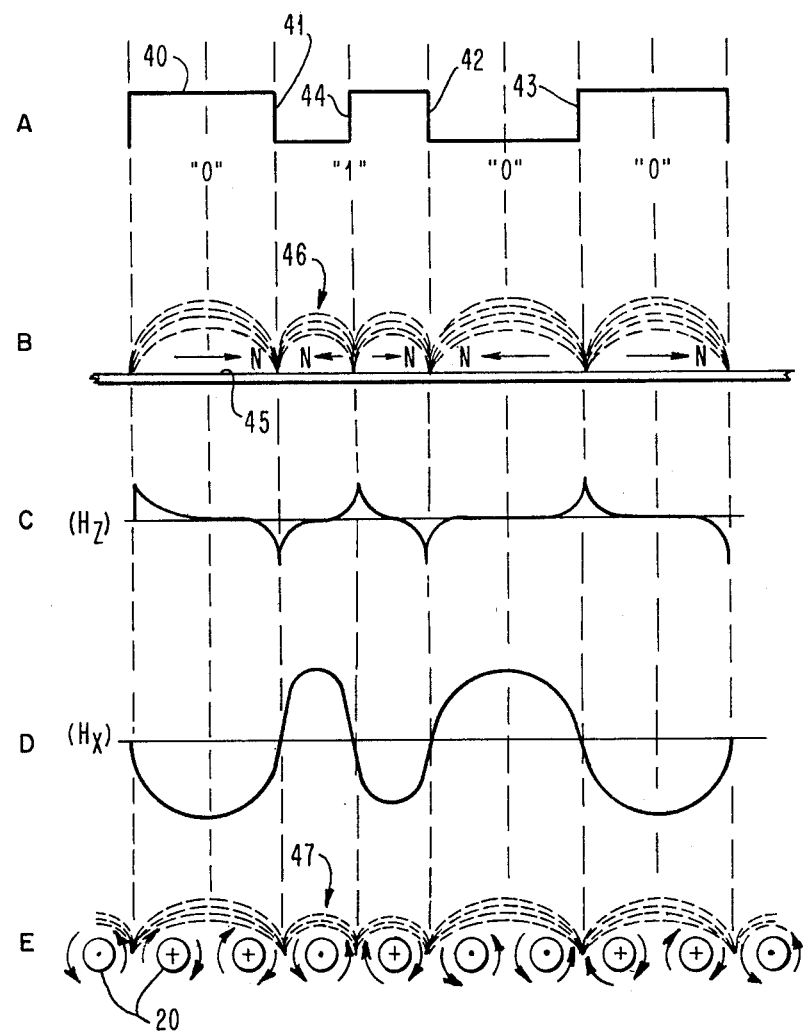

These and other objects, features and advantages of my invention will be apparent to those skilled in the art from the following description of a specific illustrative preferred embodiment thereof, wherein reference is made to the accompanying drawings of which:

FIG. 1 is a perspective view of a data entry system constructed in accordance with my invention, FIG. 2 is a diagrammatic view of a scannable strip constructed in accordance with my invention, together with the major components of the data flow path by which the strip is controlled, FIG. 3 is a circuit diagram illustrating the control of current to a single one of the conductors of the apparatus shown in FIG. 2, FIG. 4 is an explanatory diagram illustrating the relationship of flux fields produced by conductors of my invention in comparison to the flux fields produced in present binary recorded magnetic tape, FIG. 5 is an enlarged cross-sectional view of an alternate embodiment of my invention.

Referring now more specifically to the drawings, in FIG. 1 there is shown a readout device such as a conventional time-of-day clock 10, from which it is desired to directly take coded information. A magnetic hand scanner 11 reads data from clock 10 into a data receiver 12. One appropriate magnetic hand scanner 11 is available from International Business Machines Corporation, Armonk, N.Y., as part No. 4123495 which is adapted to be connected to any of several data receiving units such as the IBM 3641 Reporting Terminal.

Readout device 10 includes an elongated scannable data transfer strip or track 13, having an electronically controllable or variable data portion 14 and a pre-recorded or fixed data portion 15. The fixed data portion 15 very simply can be a piece of magnetic tape that has been pre-recorded with a digital flux pattern representing fixed information concerning the device 10, such as, for example, its location in a building. This information is recorded in accordance with a standardized format or pattern protocol that is acceptable to the data receiver 12. One convenient standardized format presently in use is known as the F/2F code. This code is characterized by a series of regularly spaced clock flux transitions having midway therebetween data bits denoted by the presence or absence of additional flux transitions. This code is particularly suited for reading by hand scanning, as it requires minimal constraint on the scanning speed.

The variable data portion 14 of the scannable strip 13, see FIG. 2, comprises an array of indicators provided by parallel electrical conductors 20 which are conveniently formed by printed circuit techniques. These conductors have two states depending the direction of current flow, which state is indicated by the magnetic flux emitted therefrom. Conductors 20 are spaced at intervals which are consistent with the code form being employed. Thus for the F/2F code mentioned above, the conductors would be evenly spaced at 10 mil centers. Alternate conductors 20 are thus associated with clock transitions and the intervening conductors are associated with data transitions. A thin layer 21 of a wear-resistant material, such as polyethylene terephthalate overlies the conductors 20 in the scanning region.

Data to be presented on variable data portion 14 is delivered from a source 22 through readout gate 23 to an output register 24 having a plurality of binary stages 25, each corresponding to a conductor 20. Each stage 25 is connected to an associated driver circuit 26 (FIG. 3) in a driver bank 27 wherein current is applied via connections 28 to the associated conductors 20 selectively in one or the other direction. The remote ends of conductors 20 are connected to ground by connections 29.

Each driver circuit 26, FIG. 3, includes a pair of AND circuits 30 and 31 whose outputs are connected to an associated conductor 20. The AND circuits 30 and 31 each have one input connected to one of a pair of oppositely directed current sources 32 and 33. Second inputs 34 and 35 to the AND circuits 30 and 31 are respectively connected to the "1" and "0" outputs of an associated stage 25 of the data register 24. A resistor 36 in ground connection 29 limits the current flow in the conductors 20. From the circuit of FIG. 3, it is seen that, depending upon whether a logical "1" or a logical "0" is stored in an associated register stage 25, either AND circuit 30 or AND circuit 31 will be activated, and current will flow in conductor 20, either toward or away from ground. This current will cause a flux field to be generated coaxially with the conductor 20 in either a clockwise or counter-clockwise direction, depending upon the direction of current flow.

The flux pattern produced by the current flowing in conductors 20 will be better understood with reference to the diagram of FIG. 4.

Line A of FIG. 4 shows a typical data pattern 0100 as represented in the F/2F code by a change of state curve 40. A change of state transition occurs at regular clock intervals such as those indicated at 41, 42 and 43. Where a logical "1" is to be represented, a change of state transition exists midway between adjacent clock transitions. For example, transition 44 lies midway between clock transitions 41 and 42.

Line B of FIG. 4 shows one way in which change-of-state curve 40 is normally implemented by recording on magnetic tape 45, shown here in enlarged cross-section. The recording operation has oriented the magnetic material of tape 45 to be of either a first state where the north pole lies to the right of the south pole, or a second state where the north pole lies to the left of the south pole. The thus magnetized material produces a flux field pattern 46 which is characteristic of the magnetic polarity and strength.

Line C of FIG. 4 represents the strength of the normal or vertical component $H_z$ of the flux field pattern 46 along the length of tape 45. Note that maximum vertical field strength exists where adjacent like poles come together. This condition exists at each of the state transitions 41, 42, 43 and 44.

Line D of FIG. 4 represents the tangential or horizontal component $H_x$ of the flux field pattern 46. Note that this field is a maximum intermediate the transitions 41, 42, 43 and 44, but that it experiences most rapid change and a change of polarity at the transitions.

Line E of FIG. 4 shows a greatly enlarged cross-sectional diagram of an array of conductors 20. The direction of current flow through these conductors is represented either by a dot for current coming out of the page or a plus for current going into the page. Each conductor 20 produces either a clockwise or counter-clockwise magnetic field as represented by the solid arrows depending upon the direction of current flow. These individual fields interact by reinforcement or counteraction to produce a composite field pattern 47 having essentially the same characteristics as that produced by a recorded tape. In other words, the normal and tangential components $H_z$ and $H_x$, illustrated in lines C and D, also describe field pattern 47.

The flux fields patterns 46 and 47 can be detected by either a magnetoresistive device which responds to the magnitude of the $H_z$ component of the field or by a more conventional inductive device whose output responds to the rate of change of the strength and direction of the $H_x$ component of the field. Both will provide peak outputs at the occurrence of transitions 41, 42, 43 and 44 by which the information contained therein can be recovered.

In operation, data source 22 produces variable data indicative of some quantity for which readout is required. In FIG. 1, this variable data could represent simply the time of day. Fixed information portion 15 of the strip 13 could include a coded pattern, for example, indicating the location within a building of the readout device 10. The information thus available could be used, for example, in monitoring the movement of parts along an assembly line where the parts themselves bear an identification encoded on a magnetic strip label. An operator sequentially scans the label as parts move on the conveyor and, following each scan, scans the strip 13 to record that a particular part has passed a particular location at a particular time of day. An access control button 48 is provided on the readout device 10 to activate the current sources 32 and 33 and to provide a temporary gate pulse to output gate 23 (FIG. 2), followed by a timed energization of driver bank 27, just prior to each scan operation. This eliminates the necessity to have continuous flow of current in conductors 20 and also freezes the data presented from source 22 to register 24 for a fixed time period during which scan can take place. If preferred, a proximity detector can be substituted for the switch 48 to perform these functions whenever magnetic hand scanner 11 approaches either end of the strip 13.

FIG. 5 shows an enlarged cross-sectional view of an alternate arrangement of conductors illustrating several techniques for tailoring the flux field pattern produced to meet special needs. In FIG. 5, four conductors, 50, 51, 52 and 53, have been arranged in a vertical insulated stack in place of each of the individual conductors 20 shown in FIGS. 2, 3 and 4. The total current required to produce the necessary flux is thus approximately divided by four. Between each set of conductors 50 through 53 is a thin magnetic flux conductor 54 of a material such as permalloy that will concentrate the flux presented to it. A protective layer 55 provides the actual scanning surface. The flux field of the conductors in each set 50 through 53 are thus communicated to the scanning surface 55 by the permalloy strips 54.

Having thus described both principles employed in the scannable readout device of my invention, as well as a preferred illustrative implementation thereof, it will be understood that various modifications, additions and deletions can be made to the specific materials disclosed without departing from the inventive concept as limited only by the appended claims.

I claim:

1. A scannable readout device for presenting data from a source in a form to be scanned by a magnetic hand-scanning device and wherein the improvement comprises
- an elongated data transfer track portion comprising, along its length, a plurality of transversely oriented electrical conductors, and
- driver circuit means responsive to data from said source and connected to said conductors for selectively applying current thereto in one direction or the other to provide a controlled flux pattern for scanning in sequence by said scanning device.

2. Scannable readout device, as defined in claim 1, further comprising a layer of wear-resistant material overlying said plurality of conductors to provide a surface over which the scanning device can run.

3. A scannable readout device, as defined in claim 2, further comprising a fixed pattern data transfer track portion of magnetizable material, said material being magnetized to present a fixed flux pattern for scanning by said scanning device, said fixed flux pattern following a pattern protocol that is common to said controlled flux pattern.

4. A scannable readout device, as defined in claim 1, wherein the said conductors each comprise a group of parallel electrical conducting elements, said groups being separated by sections of a magnetic flux conducting material.

5. A scannable readout device, as defined in claim 1, further comprising access control means for controlling the acceptance of data from said source and the energization of said driver circuit means.

6. A scannable readout device for transferring data from a source to a receiver wherein the improvement comprises
- a data transfer track having a plurality of transversely oriented electrical conductors positioned therealong,
- means responsive to data from said source and connected to said conductors for selectively applying current thereto in one direction or the other to provide a controllable flux pattern that is representative in combination of the data to be transferred, and
- scanning means connected to said receiver and being sensitive to the state of said indicators for producing a sequence of output signals to said receiver as said scanning means passes along said data transfer track.

* * * * *